United States Patent [19]
Hosoe

[11] Patent Number: 5,172,186
[45] Date of Patent: Dec. 15, 1992

[54] LASER INTERFEROMETRY LENGTH MEASURING AN APPARATUS EMPLOYING A BEAM SLITTER

[75] Inventor: Shigeru Hosoe, Hachioji, Japan

[73] Assignee: Konica Corporation, Tokyo, Japan

[21] Appl. No.: 722,109

[22] Filed: Jun. 27, 1991

[30] Foreign Application Priority Data

Jul. 3, 1990 [JP] Japan .................. 2-174432
Aug. 29, 1990 [JP] Japan .................. 2-225165

[51] Int. Cl.$^5$ ............................................. G01B 9/02
[52] U.S. Cl. ............................ 356/358; 356/351; 359/636
[58] Field of Search .................. 356/351, 358, 363; 359/495, 496, 636

[56] References Cited

U.S. PATENT DOCUMENTS

| | | | |
|---|---|---|---|
| 3,510,198 | 5/1970 | Pace | 359/496 |
| 3,536,375 | 1/1969 | Mansell | 359/495 |
| 4,702,603 | 10/1987 | Augustyn | 356/351 |
| 4,717,250 | 1/1988 | Sommargren | 356/351 |

FOREIGN PATENT DOCUMENTS

| | | | |
|---|---|---|---|
| 2375577 | 8/1978 | France | 356/351 |
| 9015357 | 12/1990 | PCT Int'l Appl. | 359/496 |

Primary Examiner—Samuel A. Turner
Attorney, Agent, or Firm—Jordan B. Bierman

[57] ABSTRACT

A laser interferometry length measurer for determining a moving distance of an object. The measurer includes a 45° rotatory polarization plate for dividing a source light beam to a measuring beam and a reference beam; a reflector, which is placed to the object, for reflecting the measuring beam; a prism for composing the reference beam and the reflected measuring beam into a composed source beam; a beam splitter prism for distributing the composed source beam into a plural light beams which have different phases; and a determination unit to determine the moving distance of the object according to those beams.

10 Claims, 9 Drawing Sheets

LIGHT-SENSITIVE UNIT
BEAM TO BE DETECTED

LASER INTERFEROMETRY LENGTH MEASURING AN APPARATUS EMPLOYING A BEAM SLITTER

BACKGROUND OF THE INVENTION

The present invention relates to a polarization beam splitter and a laser interferometry length measuring apparatus, and more particularly, to a polarization beam splitter suitable for causing two beams separated by the polarization beam splitter to be in parallel each other and to a laser interferometry length measuring apparatus employing the polarization beam splitter.

In the laser interferometry length measuring apparatus, a gas laser or a semiconductor laser is used as a light source, and after its beam is separated into a reference beam and a length measuring beam, a beam reflected from an object whose length is to be measured is combined again with the reference beam, and an interference fringe and a beat thus caused by the combination thereof are observed for obtaining length measurement (displacement) information.

The construction of such laser interferometry length measuring apparatus is based on interferometer of Michelson type shown in FIG. 5. To be more concrete, a beam from light source 20 is split by polarization beam splitter 21 into a reference beam and a length measuring beam, and the length measuring beam reflects on movable mirror 22 attached on an object whose length is to be measured, and then is combined, at polarization beam splitter 21, with a reference beam reflected on fixed mirror 23 to generate interference fringes. In this case, there are two systems; one is an interference fringes counting system that counts movement of interference fringes generated by the returning beam and the other is a heterodyne system wherein coherent plural wavelengths are used for generating beats, and frequency changes of beats are detected by utilizing the phenomenon that the frequency of the length measuring beam is Doppler-shifted depending on the speed of the object whose length is to be measured (see PRECISION ENGINEERING Vol. 1, No. 1 (1979) 85, PRECISION ENGINEERING Vol. 5, No. 3 (1983) 111).

When splitting into the reference beam and the length measuring beam at a beam splitter as described above, the reference beam and the length measuring beam are separated in the most simple way by the beam splitter so that they may meet at right angles each other to irradiate respectively the fixed mirror and the movable mirror as shown in FIG. 5. However, when an optical path is provided almost straight, both the reference beam and the length measuring beam are needed to go out in parallel each other. In this case, the beam splitter and a reflection plate have been combined so that the reference beam and the length measuring beam both are in parallel may be obtained.

In FIG. 6, polarization beam splitting surface 31 is provided on a joint surface between triangle prism 32 and triangle prism 33, and triangle prism 35 having thereon a reflection surface (or a total reflection surface) 34 is positioned so that the above-described reflection surface 34 and polarization beam splitting surface 31 may be in parallel each other, thus, a beam enters or leaves a surface of each of prisms 32, 33 and 35 at a right angle. A beam from a light source entering the above-described polarization beam splitting surface 31 at an angle of 45° is split, for example, to be a reference beam that is a transmitting beam and a length measuring beam that is a reflected beam, and the above-mentioned length measuring beam that advances in the direction meeting at a right angle with aforementioned reference beam is caused to reflect and refracted on the aforesaid reflection surface 34, in the direction that is in parallel with the above-described reference beam.

Incidentally, the mark "⇌" and the mark "⊙" in FIG. 6 show respectively the directions of polarization meeting at a right angle each other.

However, when making both a reference beam and a length measuring beam to be in parallel as described above, even when polarization beam splitting surface 31 and reflection surface 34 are precisely arranged to be in parallel each other, the reference beam and the length measuring beam can not be in parallel precisely and thereby the reflected beam can not be combined precisely if a vertical angle of each triangle prism is not accurate and thereby beam-leaving surfaces on triangle prisms 32 and 35 can not be in parallel precisely.

Further, in the above-described construction, an optical element composed of triangle prisms 32 and 33 and an optical element composed of triangle prism 35 need to be positioned precisely even if a vertical angle of each triangle prism is accurate. When such positioning is not accurate, polarization beam splitting surface 31 and reflection surface 34 can not be in parallel precisely, thus, parallelism of leaving beams after their separation is deteriorated.

In this connection, when prism 36 whose lateral section is a parallelogram and triangle prism 37 are used in combination as shown in FIG. 7, polarization beam splitting surface 31 and reflection surface 34 can be in parallel stably if parallelism of end faces is secured in the course of making prism 36. However, a beam reflected on a polarization beam splitting surface (a length measuring beam) and a transmitting beam (a reference beam) leave end faces of different prisms respectively. Therefore, parallelism of both end faces needs to be accurate, and it has been difficult to obtain stably the separated beams which are in parallel each other, due to parallelism of joint surfaces and accuracy of a vertical angle of each triangle prism both of which can not be precise constantly.

The present invention has been devised in view of the aforesaid problems, and its first object is to provide a polarization beam splitter wherein there are used prisms in the form of parallel plates whose parallelism can be obtained relatively easily compared with vertical angle accuracy of a triangle prism, and thereby two beams generated through separation on a polarization beam splitter can be caused to be parallel beams which are accurate in terms of parallelism without any requirement for high level accuracy of a vertical angle of each triangle prism and of joint thereof. The first object in to further provide a laser interferometry length measuring apparatus wherein the specific characteristics of the above mentioned polarization beam splitter are utilized.

Further example of the constitution of a laser interferometry length measuring apparatus of a type of counting number of interference fringes is shown in FIG. 13. To be concrete, a beam from stabilized laser light source 130 is separated by beam splitter 131 into a reference beam and a length measuring beam, and the length measuring beam is reflected on movable corner cube (a movable mirror) 132 attached on an object whose length is to be measured, then, the reflected length measuring beam is combined with the reference beam reflected on fixed corner cube (a fixed mirror) 133 on the beam splitter 131 to generate an interference fringe. (See page 108 and others in Vol. 26 No. 2 (1988) of Optical and Electro-optical Engineering Contact).

For the detection of intensity of interference fringes caused be combined light including a reference beam and a length measuring beam in above-described laser interferometry length measuring apparatus, or for the detection of beat signals of interference fringes caused by two-frequency light source, a polarization detection optical system is usually used for optical phase separation so that both amount and direction may be observed. Each of beams thus phase-separated is subjected to photoelectric conversion conducted by a photoelectric converter composed of a photodiode or the like, thus the intensity of interference fringes or beat signals of interference fringes are detected.

In FIG. 13, a reference beam that goes to fixed corner cube 133 and returns from it and then is combined with a length measuring beam is caused to go to wavelength $\lambda/8$ phase plate 134 and return from it so that the reference beam may become circularly polarized light, while, a length measuring beam that goes to movable corner cube 132 and returns from it is caused to remain as linearly polarized light, thus the S/N ratio of signals can be improved. In this case, length measuring signals of three phases (0°, 90° and 180°) which are different each other by 90° due to angular positions of polarization plate 135 around an optical axis are obtained.

In addition to the foregoing, there are other methods of polarization detection optical system wherein interference fringe intensity signals of two phases differing each other by 180° are obtained as a transmission beam or a reflection beam by positioning a polarization beam splitter to be inclined by 45° against an optical axis, and signals of three phases or four phases differing each other by 90° are obtained by causing a beam transmitted through a $\lambda/4$ phase plate to enter one of two polarization splitter, or signals whose phase is shifted by 90° are obtained by shifting a phase through a phase plate of $\lambda/4$ wavelength by 90° and then extracting 45° components of a reference beam and a length measuring beam.

In a polarization detection optical system, it is possible to identify the direction of change in phase of interference fringes if signals of two phases (sin $\theta$, cos $\theta$) differing each other by 90° can be obtained. In the example shown in FIG. 13, however, signals of three phases (0°, 90° and 180°) differing each other by 90° are generated purposely in an optical system for the purpose of restraining an influence of the change in the intensity level of interference fringes caused by a deviated optical axis or by flickering air, and signals of three phases thus generated are converted photoelectrically by photoelectric conversion element 136 such as a photodiode, and thereby signals of two phases (sin $\theta$, cos $\theta$) differing each other by 90° are generated by obtaining difference between two phases by means of subtracter 137, thus, the intensity components changed commonly by the above-described deviated optical axis can be eliminated.

Incidentally, in FIG. 13, the numeral 138 is a filter, 139 is an amplifier and 140 is a polarization beam splitter.

When signals of plural phases differing each other obtained by the polarization detection optical system are received by the photoelectric conversion element, the sectional area of a beam is larger than the area of light-receiving section because it is necessary to establish an allowable value for a tilt of the beam. In this case, when concentricity of the reference beam and the length measuring beam is excellent enough, there is no problem. However, when the concentricity of the reference beam and the length measuring beam is slightly deteriorated and thereby plural interference fringes appear within the detection beam as shown in FIG. 14, phasic relation of three phases gets out of order, resulting in the deterioration of measurement accuracy unless relative position of the light-receiving section of the photoelectric conversion element which converts photoelectrically the 3-phase signals after the aforesaid polarization against the beam is precisely adjusted.

Adjustment of the relative position of the light-receiving section of the photoelectric conversion element against the beam is very difficult. In the case of separation into three phases each differing by 90° shown in FIG. 13, when concentricity of the reference beam and the length measuring beam is changed, phases of 3-phase signals which should be detected at an interval of 90° are changed. Therefore, the phasic relation of 2-phase signals after taking a difference can not be 90° precisely, resulting in a problem for practical use.

When the axis of abscissa represents cos $\theta$ and the axis of ordinate represents sin $\theta$ for 2-phase signals representing signals which are divided into three phases differing in terms of a phase by 90° each other and from which a difference has been taken, a Lissajous's figure takes a form of a circle as shown in FIG. 15, and its rotation direction, such as a clockwise rotation or a counter clockwise rotation, tells a direction of a phase change of interference fringes, close or far direction.

However, when the above-mentioned 2-phase signals are not harmonious in terms of a phase, the above-described Lissajous's figure does not take a circle as shown in FIG. 16 but it takes an oval whose major axis (minor axis) does not exist on X-axis and Y-axis. In this case, when a high measurement accuracy is kept through interior division of a phase of one circumference $2\pi$ of the Lissajous's figure, the movement on the Lissajous's figure shows non-uniform motion and non-circle (oval) even if the length measurement change is uniform. Therefore, when the interior-divided length measurement values are read from a locus of the Lissajous's figure, it is not possible to avoid a cyclic length measurement error wherein one rotation is one cycle. In addition to that, the form of an oval is very difficult to be corrected by delaying electrically the phase, because the range of signal velocity is broad to be from DC—several MHz.

Namely, the phase relation (90°) of final 2-phase signals (sin $\theta$, cos $\theta$), when it is not secured fully in the first optical system, tends to deteriorate the linearity of length measurement accuracy. This is a primary error related to the linearity of a laser interferometry length measuring apparatus corresponding to the intensity change of one cycle ($2\pi$) of interference fringes, and the second and tertiary errors with frequencis of $\pi$ and $\pi/2$ ... are further assumed. However, it is possible to solve problems in terms of accuracy by eliminating the primary error, because the actual non-linearity is mainly caused by the primary error caused by one occasion of reflection of unnecessary light.

Further, when verifying a phase relation of 3-phase signals (0°, 90° and 180°) referring FIG. 9, there hardly is movement of phase difference of 180° by means of a polarization beam splitter between the first phase and the third phase (0°, 180°), but the 90° phase shift by means of a phase plate for the second phase of 90° position needs to be conducted accurately. Therefore, there is possibility that a phase difference is easily changed by the deviation of an optical axis that is caused by mechanical variation. In this case, when the phase of the second phase is deviated to the first phase by $\Delta\theta$ as shown in FIG. 17, mutual errors of about $\Delta\theta^2$ take place on difference signals between the first phase and the second phase and difference signals between the second phase and the third phase, as shown in the following equations.

The first phase − the second phase $$S_{12} = \sin\theta - \cos(\theta + \Delta\theta)$$
$$= \sin\theta - \cos\theta \cdot \cos\Delta\theta + \sin\theta \cdot \sin\Delta\theta$$

The second phase − the third phase $$S_{23} = \cos(\theta + \Delta\theta) + \sin\theta$$
$$= \sin\theta + \cos\theta \cdot \cos\Delta\theta - \sin\theta \cdot \sin\Delta\theta$$

when $\theta = 0$, $$S_{12} = -\cos\Delta\theta$$
$$= -1 + \Delta\theta^2/2 - \Delta\theta^2/24 + \ldots$$
$$S_{23} = \cos\Delta\theta$$
$$= 1 - \Delta\theta^2/2 + \Delta\theta^4/24 + \ldots$$

As described above, when obtaining 2-phase signals by obtaining a difference of 3-phase signals differing in terms of a phase by 90° in the optical system for detection of polarization light in a laser interferometry length measuring apparatus, the phase of the first 3-phase signals obtained is required to be accurate, and in particular, the phase deviation caused by the deviated optical axis of the second phase (90°) that is obtained among the above-described 3-phase signals through the transmission of a phase plate has been a problem. Further, as stated above, the relative position of a photoelectric transfer element against a beam of each phase after separation has been needed to be accurate.

The invention has been devised in view of the situation mentioned above, and its second object is that an optical axis of each of 3-phase signals among four phases can be obtained accurately as a parallel beam and a phase angle deviation can be corrected optically in a polarization light detecting optical system to be used for a laser interferometry length measuring apparatus wherein four-phase splitting is especially possible due to two sets of polarization beam splitters.

SUMMARY OF THE INVENTION

In the polarization beam splitter in the first example for achieving the first object of the invention, a reflection surface is formed on one end among both ends facing in parallel on a prism of a parallel plate form, a part of other end is provided with polarization beam split coat and a triangle prism is cemented to the end surface where the above-described polarization beam split coat is provided. Thus, the light reflected on the afore-mentioned polarization beam splitter reflects on the above-mentioned reflection surface, transmits a transmission portion where no polarization beam split coat is provided on the above-described other end, and enters the aforesaid triangle prism, and at the same time, the reflected light from the aforesaid polarization beam split coat and the transmitted light go out of the same end surface of the aforesaid triangle prism.

Further, in the laser interferometry length measuring apparatus of the invention, the aforesaid polarization beam splitter is used for separating the beam of a light source into a reference beam and a length measuring beam, and the reference beam reflected on a fixed mirror and the length measuring beam reflected on a movable mirror attached on a subject whose length is to be measured are returned to the aforesaid polarization beam splitter and are combined, so that the outgoing beam that is in parallel with a beam of the aforesaid light source may be obtained.

On the polarization beam splitter having the structure mentioned above, the parallelism of both ends facing in parallel each other on a prism of a parallel plate form can be obtained accurately relatively easily. Therefore, the parallelism between polarization beam split coat and a reflection surface both provided on both ends of the prism can be obtained. Therefore, the transmission beam and the reflection beam both on the polarization beam split coat can enter the triangle prism, keeping their good condition of parallelism. In addition to that, when the transmission beam and the reflection beam mentioned above go out of the triangle prism, they go out of the same end surface. Therefore, the parallelism of the reflected beam and the transmission beam is not affected by the accuracy of a vertical angle of the triangle prism, and thereby both beams can go out of the polarization beam splitter while they keep their good parallel condition.

When such polarization beam splitter as stated above is used for a laser interferometry length measuring apparatus for separation into a reference beam and a length measuring beam and for combination their returned beams, the returned beams can be combined satisfactorily and measurement based on the outgoing beams which are in parallel with a beam of a light source can be carried out, because the reference beam and the length measuring beam can be kept in parallel each other satisfactorily.

In the polarization detecting optical system in the second example for attaining the second object of the invention, beam split coat and polarization beam split coat are provided partially and independently on one end of both end surfaces facing in parallel on a prism of a parallel plate form, and on the other end surface, there is provided a reflection surface so that a reflected beam coming from a beam entering the aforesaid prism of a parallel plate form through the aforesaid beam split coat may reflect on the aforesaid reflection surface and thereby enters the aforesaid polarization beam split coat after going and returning in the prism of a parallel plate form, and then separated into the reflected beam and the transmitted beam by the aforesaid polarization beam split coat, thus the reflected beam through the aforesaid polarization beam split coat reflects on the aforesaid reflection surface and goes out of the prism of a parallel plate form. Further, in the polarization detecting optical system, a phase plate having a phase difference of wavelength/4 or more is caused to transmit a transmitted beam through the aforesaid beam split coat and the transmitted beam through the aforesaid phase plate is separated into a reflected beam and a transmitted beam by means of the polarization beam splitter.

In this case, it is possible to arrange so that a 45° rotatory polarization plate may be provided and a beam transmitted through the 45° rotatory polarization plate may be caused to enter the aforesaid prism of a parallel plate form, and it is preferable that the aforesaid 45° rotatory polarization plate and the prism of a parallel plate type are cemented together.

Further, it is preferable that the aforesaid phase plate is supported to be movable around an optical axis.

It is further preferable that signals having different phases obtained as a transmitted beam or a reflected beam of the aforesaid polarization beam split coat and the aforesaid polarization beam splitter are narrowed by a focusing lens to be received by a light receiving section.

It is further possible to cause a beam entering the aforesaid prism of a parallel plate form and polarization-detected to be a combined beam of both a reference beam and a length measuring beam both in a laser interferometry length measuring apparatus.

In a polarization detecting optical system having the structure mentioned above, an accuracy of parallelism of both ends facing in parallel on a prism of a parallel plate form can be obtained relatively easily. Therefore, the accuracy of parallelism of beams entering respectively beam split coat and polarization beam split coat in a prism and a beam reflecting on a reflection surface can be obtained, and as a result, the accuracy of parallelism of a transmitted beam at beam split coat or polarization beam split coat and a reflected beam going out of a prism after reflection on beam split coat, polarization beam split coat and a reflection surface can be obtained easily.

When a beam transmitted through the 45° rotatory polarization plate can be caused to enter a prism of a parallel plate form in a certain arrangement, it is not necessary to provide an incidence prism surface to be tilted by 45° against an optical axis.

Furthermore, when there is supported rotatably around an optical axis a phase plate having a phase difference of not less than λ/4 into which a beam transmitted through beam split coat enters, an error of a phase difference caused by the deviation of an optical axis can be corrected by the rotation of the aforesaid phase plate.

When outgoing signals having different phases are received by the light-receiving section after being narrowed by a focusing lens, detection beams can be received efficiently by the light-receiving section.

A polarization detecting optical system in the present example can be used for phase division of combined beams including a reference beam and a length measuring beam in a laser interferometry length measuring apparatus, thus it is possible to improve length measuring accuracy.

DETAILED DESCRIPTION OF THE INVENTION

The first example of the invention will be explained as follow.

Figure 1:
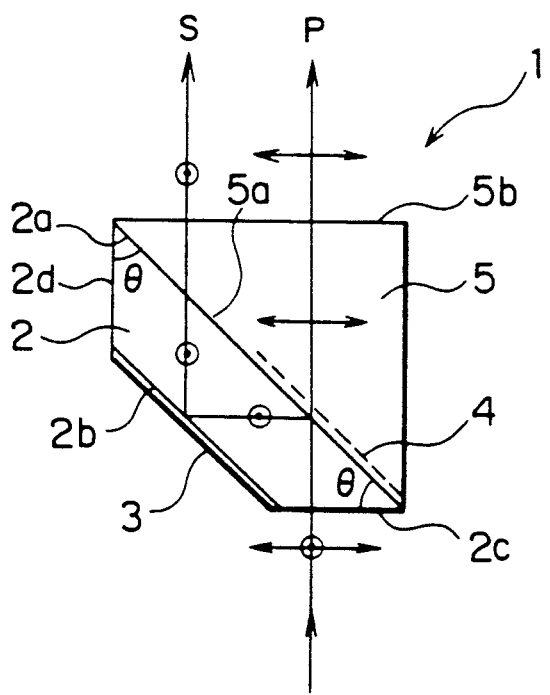
FIG. 1 is a plane view showing an example of a polarization beam splitter related to the first example of the invention.

In FIG. 1 showing structure of a polarization beam splitter related to the present example, polarization beam splitter 1 is composed of parallel-plate-shaped prism 2 and triangle prism 5.

The aforesaid parallel-plate-shaped prism 2 is formed to be a trapezoid in its lateral section, and both sides 2c and 2d are formed so that an included angle θ formed by one end surface 2a among both end surfaces 2a and 2b facing in parallel each other and side 2c or 2d may be 45°. On the most part of the aforesaid end surface 2b, there is formed a reflection surface (a total reflection surface), and on the area that is almost half of the aforesaid end surface 2a near the side 2c is provided with polarization beam split coat 4.

On the parallel-plate-shaped prism 2 provided with reflection surface 3 and polarization beam split coat 4 as described above, there is cemented the triangle prism 5 which is formed in its lateral section to be a right-angled equilateral triangle having a rectangular vertical angle. Bottom surface 5a facing the aforesaid rectangular vertical angle and end surface 2a of the aforesaid parallel-plate-shaped prism 2 are cemented by means of adhesives.

In the polarization beam splitter 1 having the structure mentioned above, a beam (e.g., a laser beam) from an unillustrated light source is arranged so that it may enter at about a right angle to the side 2c of the parallel-plate-shaped prism 2, and thereby the beam enters polarization beam split coating 4 with an incidence angle of 45°.

A beam reflected on polarization beam split coat 4 (hereinafter, referred simply to a reflected beam) hits, with an incidence angle of 45°, the reflection surface 3 that is in parallel with the polarization beam split coat 4, and then reflects thereon. Therefore, the beam reflected on the reflection surface 3 becomes to be in parallel with a beam from a light source, and the reflected beam from the reflection surface 3 passes through the transmissible portion having no polarization beam split coat 4 on the end surface 2a, and enters the triangle prism 5.

In this case, the aforesaid parallel-plate-shaped prism 2 and triangle prism 5 are made of the same material in terms of a refractive index and consequently, a beam which has passed through the polarization beam split coat 4 (hereinafter, referred simply to a transmitted beam) and a beam reflected on the reflection surface 3 enter the triangle prism 5 without being refracted and advance straight keeping their parallelism to go out of side 5b that is one of two sides forming a vertical angle of the triangle prism 5.

In the structure mentioned above, two parallel end surfaces of the parallel-plate-shaped prism 2 can be processed and finished relatively easily and thereby the parallelism of the reflection surface 3 and the polarization beam split coat 4 both provided respectively on parallel end surfaces of the parallel-plate-shaped prism 2 can be assured, resulting in assurance of parallelism of an incident beam to the polarization beam split coat 4 and a reflected beam from the reflection surface 3.

Parallelism between the incident beam to the polarization beam split coat 4 and the reflected beam from the reflection surface 3 can be assured even when an incident beam from the light source enters the side 2c obliquely and is refracted. Even when accuracy of the aforesaid included angle $\theta$ and accuracy of the position of a light source are not satisfactory, therefore, parallelism between the transmitted beam which passes through the polarization beam split coat 4 to advance and the reflected beam reflecting on the reflection surface 3 can be assured if accuracy of two parallel end surfaces of the parallel-plate-shaped prism 2 and flatness of each side are secured.

Further, when the aforesaid reflected beam and the transmitted beam go out of polarization beam splitter 1, they go out the same side 5b. Therefore, they can go out thereof without being deteriorated in terms of their parallelism, even when accuracy of a vertical angle of the triangle prism 5 and cementing accuracy between the triangle prism 5 and the parallel-plate-shaped prism 2 are unsatisfactory. The reason for that is as follows. Namely, even when the reflected beam and the transmitted beam do not cut the side 5b at right angles and thereby the reflected beam and the transmitted beam are refracted at the side 5b, they are refracted keeping their parallelism if the flatness of the side 5b is secured.

In the polarization beam splitter 1 of the present example, even when accuracy of a vertical angle of the triangle prism 5, accuracy of the relative position of a light source and polarization beam splitter 1, and further cementing accuracy are not satisfactory, the transmitted beam and the reflected beam both split by the polarization beam split coat 4 can go out keeping their high accuracy of parallelism, if flatness of each end surface (transmission surface) and parallelism between both end surfaces of the parallel-plate-shaped prism 2 are secured.

Though the aforesaid included angle $\theta$ in the above-described example is 45°, it is apparent that parallelism between the transmitted beam and the reflected beam can be obtained with an included angle other than 45°. It is also possible to arrange so that a part of the end surface 2b of the parallel-plate-shaped prism 2 may be free from the reflection surface 3 to transmit a beam from a light source.

Incidentally, a mark "⇆" and a mark "⊙" in FIG. 1 represent respectively polarization directions which cross at right angles each other.

Figure 2:
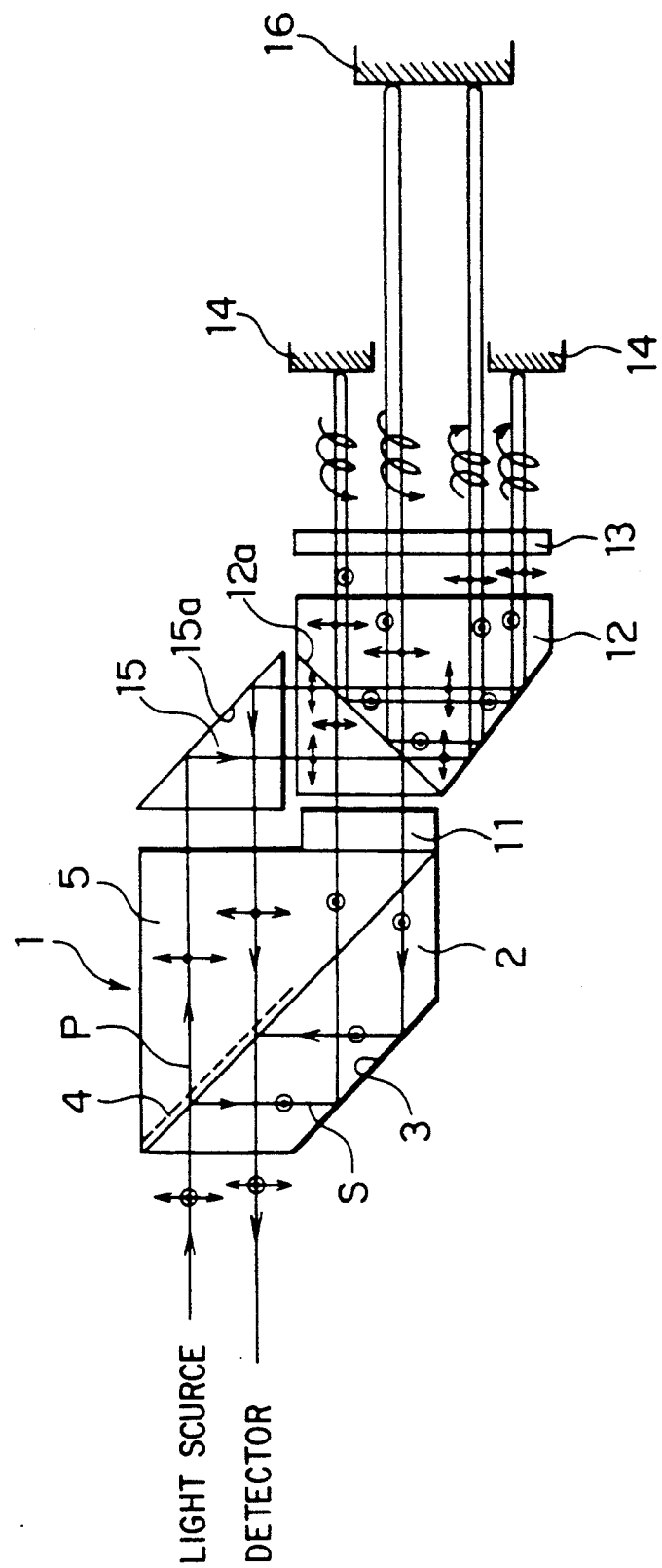
FIG. 2 is a schematic structural diagram showing the structure and polarization characteristics of a laser interferometry length measuring apparatus related to the first example of the invention, FIGS. 3 and 4 respectively represent diagrams showing examples wherein layout of optical elements of the laser interferometry length measuring apparatus in FIG. 2 is changed.

FIG. 2 shows an example wherein the polarization beam splitter 1 shown in FIG. 1 is employed in a laser interferometry length measuring apparatus.

In the example, a laser beam from an unillustrated light source is caused to enter the polarization beam splitter 1 as a mixture of linearly polarized beams having planes of polarization meeting at right angles each other, and is split, by the aforesaid polarization beam splitter 1, into length measuring beam P (polarization direction is shown with "⇆" in FIG. 2) that passes through the polarization beam split coat 4 and reference beam S (polarization direction is shown with "⊙" in FIG. 2) that reflects on the polarization beam split coat 4 and on the reflection surface 3 and is obtained as a beam which is in parallel with the aforesaid length measuring beam P.

The reference beam S that reflects on the polarization beam split coat 4 and on the reflection surface 3 and then passes through the transmission portion having no polarization beam split coat 4 on the parallel-plate-shaped prism 2 and goes out thereof enters corner cube prism 12, after being converted by $\lambda/2$ phase plate (90° rotatory polarization plate) 11 cemented on the triangle prism 5 of the polarization beam splitter 1 so that its polarization directions may cross at right angles each other (in the direction "⇆" in FIG. 2). Polarization beam split surface 12a of the aforesaid corner cube prism 12 transmits only light with a polarization direction shown with "⇆" among polarization direction shown with "⊙" in FIG. 2 and polarization direction meeting with aforesaid polarization direction at right angles. Therefore, the aforesaid reference beam S passes directly through the polarization beam split surface 12a and passes through $\lambda/4$ phase plate 13 to be converted to a circularly polarized beam.

Reference beam S converted to a circularly polarized beam reflects on fixed mirror 14 perpendicularly thereto and passes through $\lambda/4$ phase plate 13 again to be changed to the polarization direction shown with "⊙" in FIG. 2 that is a polarization direction for reflecting on the polarization beam split surface 12a. Therefore, the reference beam S returned from fixed mirror 14 reflects on the polarization beam split surface 12a and is advanced to fixed mirror 14 again by a reflection surface (or a total reflection surface) of the corner cube prism 12.

In this case, the reference beam is converted to a circularly polarized beam again by $\lambda/4$ phase plate 13 and then is reflected on the fixed mirror 14, and when the reflected beam which is a circularly polarized beam passes through $\lambda/4$ phase plate 13 on its way back, it is converted to the polarization direction shown with "⇆" that is a transmission polarization direction of polarization beam split surface 12a. Therefore, the reference beam S reflected twice on the fixed mirror 14 and is returned to corner cube prism 12 passes directly the polarization beam split surface 12a in the direction meeting at right angles with that for entering the corner cube prism 12, and then is refracted by and reflected on the reflection surface (or a total reflection surface) 15a of the triangle prism 15 in the direction which is in parallel with a beam from light source to be returned again to the polarization beam splitter 1.

The reference beam S returned to the polarization beam splitter 1 passes through the polarization beam split coat 4 and advances straight to go out of the polarization beam splitter 1 keeping its parallelism with a beam from a light source.

On the other hand, length measuring beam P whose polarization direction for passing through the polarization beam split coat 4 is shown with "⇆" changes its direction at right angles in the aforesaid triangle prism 15 and passes through the polarization beam split surface 12a of the corner cube prism 12 to be reflected on the reflection surface (or a total reflection surface) of the corner cube prism 12.

The length measuring beam P mentioned above passes through the aforesaid λ/4 phase plate 13 to be converted to a circularly polarized beam and reflects at right angles on movable mirror 16 mounted on a subject whose length is to be measured and passes through the λ/4 phase plate 13 again to be converted to the polarization direction shown with "⊙" in the figure. Therefore, it is reflected on the polarization beam split surface 12a and advances again toward the movable mirror 16.

In this case, the length measuring beam is converted to a circularly polarized beam when passing through the λ/4 phase plate 13, and when returned from the movable mirror 16, it passes through the λ/4 phase plate 13 again to be converted to the polarization direction shown with "↔" in the figure. Therefore, it can pass through the polarization beam split surface 12a of the corner cube prism 12 and enters λ/2 phase plate (90° rotatory polarization plate) 11 where it is converted to the polarization direction shown with "⊙" in the figure.

Then, the length measuring beam passes through the transmission portion having no polarization beam split coat 4 on the parallel-plate-shaped prism 2 of the polarization beam splitter 1 and is reflected on the reflection surface 3, thus the reflected beam enters the polarization split coat 4. In this case, however, the length measuring beam is reflected thereon because its polarization direction is a reflection direction, and is combined with the aforesaid returning reference beam S to go out of the polarization beam splitter 1 and enters an unillustrated detector.

Due to the structure mentioned above, parallelism between the reference beam S and the length measuring beam P both split by the polarization beam splitter 1 can be obtained accurately as described above. Therefore, parallelism of returning beams can be maintained, returning beams can be combined accurately, and the degree of freedom for setting a length measuring apparatus is great and thereby the apparatus is easy to operate because a beam from the light source and a beam after the measurement are in parallel, which are advantageous points. It is further possible to align straightly structural optical elements such as polarization beam splitter 1, corner cube prism 12, fixed mirror 14 and movable mirror 16 on the whole. Therefore, it is possible to reduce the vertical height in the figure and thereby to make each optical element small, which enables a light and small length measuring apparatus to be realized. Further, due to the small-sized length measuring apparatus mentioned above, an optical path therein is shortened and thereby the apparatus is less affected by the ambient disturbances, resulting in an improvement of stability in length measurement.

Incidentally, in FIG. 2, an optical path to cause a beam from a light source to enter and an optical path to cause a beam after length measurement to go out can also be replaced with each other. In the aforesaid arrangement, length measurement information can be detected either by an interference fringes counting system or by a heterodyne system.

Figure 3:
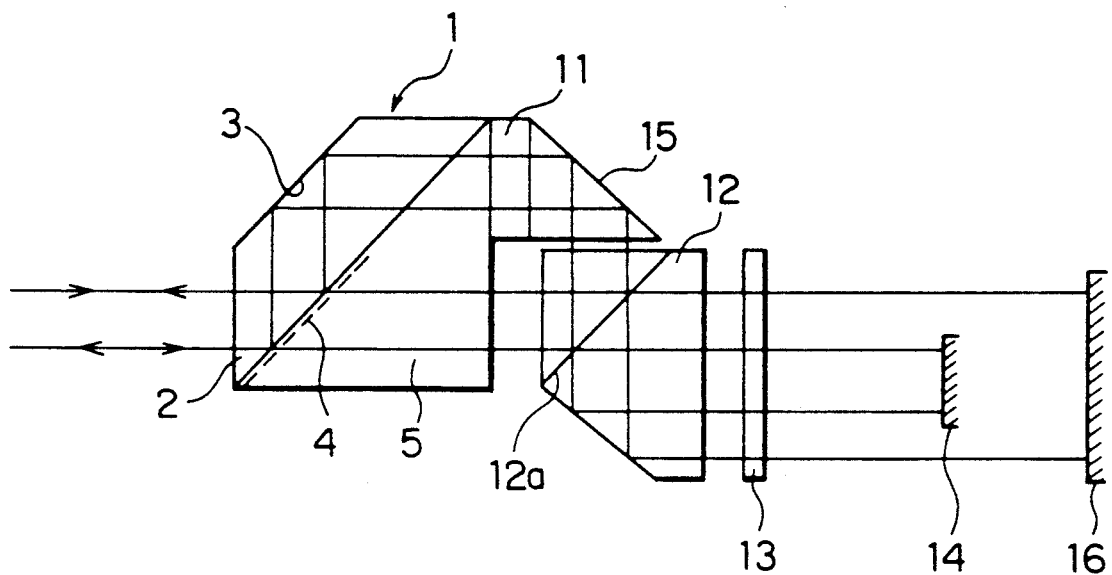
Figure 4:
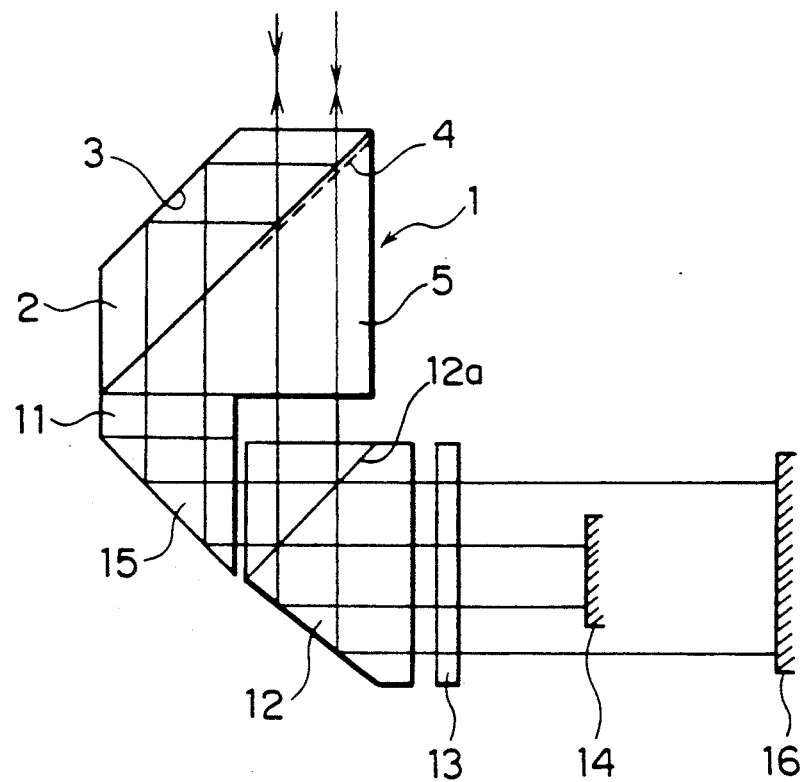
Figure 5:
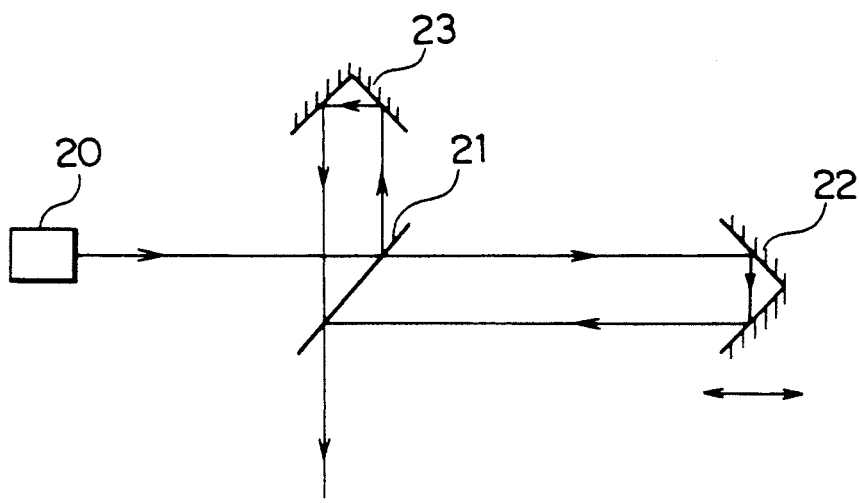
FIG. 5 is a basic diagram of a laser interferometry length measuring apparatus, FIGS. 6 and 7 respectively represent plan views showing conventional polarization beam splitters.
Figure 6:
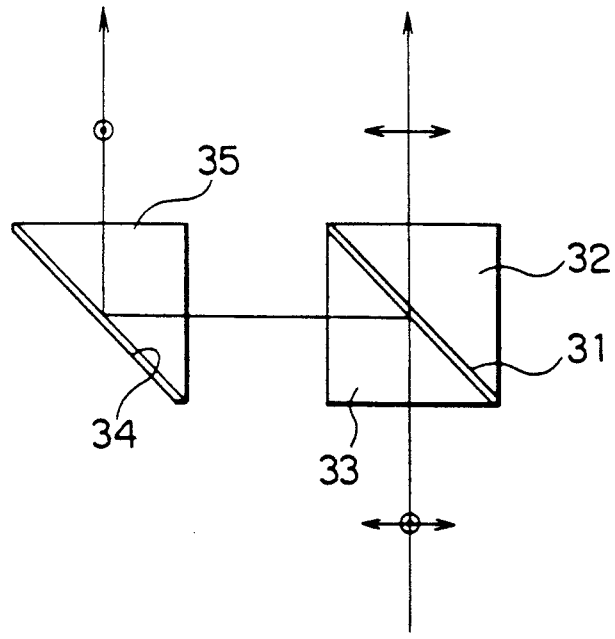
Figure 7:
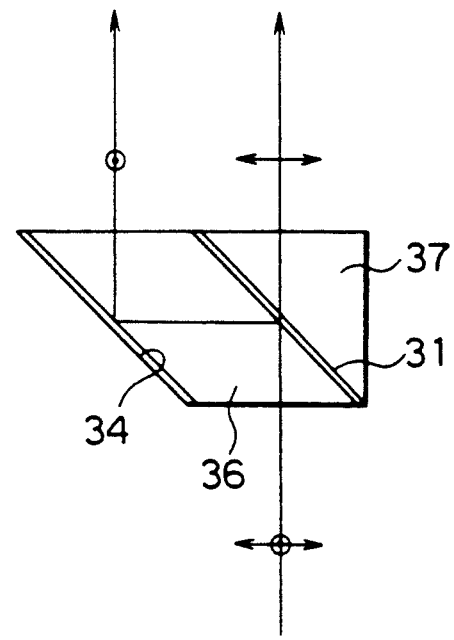

FIG. 3 shows a laser interferometry length measuring apparatus shown in FIG. 2 wherein structural optical elements remain unchanged and their locations are changed. To be concrete, in FIG. 2, polarization beam splitter 1 is provided only with cemented λ/2 phase plate (90° rotatory polarization plate) 11, but in FIG. 3, triangle prism 15 is further cemented solidly. In such an arrangement, reference beam S and length measuring beam P can be split and returned similarly to the foregoing, but when an element composed of polarization beam splitter 1, λ/2 phase plate 11, and triangle prism 15 is turned upside down for changing its direction by 90°, the arrangement will become the one shown in FIG. 4 and the same operations as the foregoing can be done. Therefore, even when the optical path is required to be L-shaped as shown in FIG. 4 or it is required to be almost straight as shown in FIG. 3, it is possible to cope with such requirement without adding a reflection plate and others, if an element wherein polarization beam splitter 1, λ/2 phase plate 11 and triangle prism 15 are united solidly can be positioned selectively to the location shown in FIG. 3 and the location shown in FIG. 4

In the construction wherein polarization beam splitter 1, λ/2 phase plate 11 and triangle prism 15 are united solidly so that the direction of an optical system may be changed by 90° as described above, cementing positions are not limited to those shown in FIGS. 3 an 4, and the optical system can be changed by 90° similarly at various positions for combination.

As described above, in the polarization beam splitter shown in the first example, a beam reflecting on a polarization beam split coat and a beam passing therethrough can go out as parallel beams keeping accurate parallelism without being affected by accuracy of a vertical angle of the triangle prism and by accuracy of cementing. Therefore, when it is used for a laser interferometry length measuring apparatus, returning beams can be combined accurately, and a beam from a light source and a beam combined after length measurement can be obtained as parallel beams, and the degree of freedom for setting a length measuring apparatus can be improved and optical elements can be aligned on the whole, resulting in a small-sized apparatus.

The second example of the invention will be explained as follows.

Figure 8:
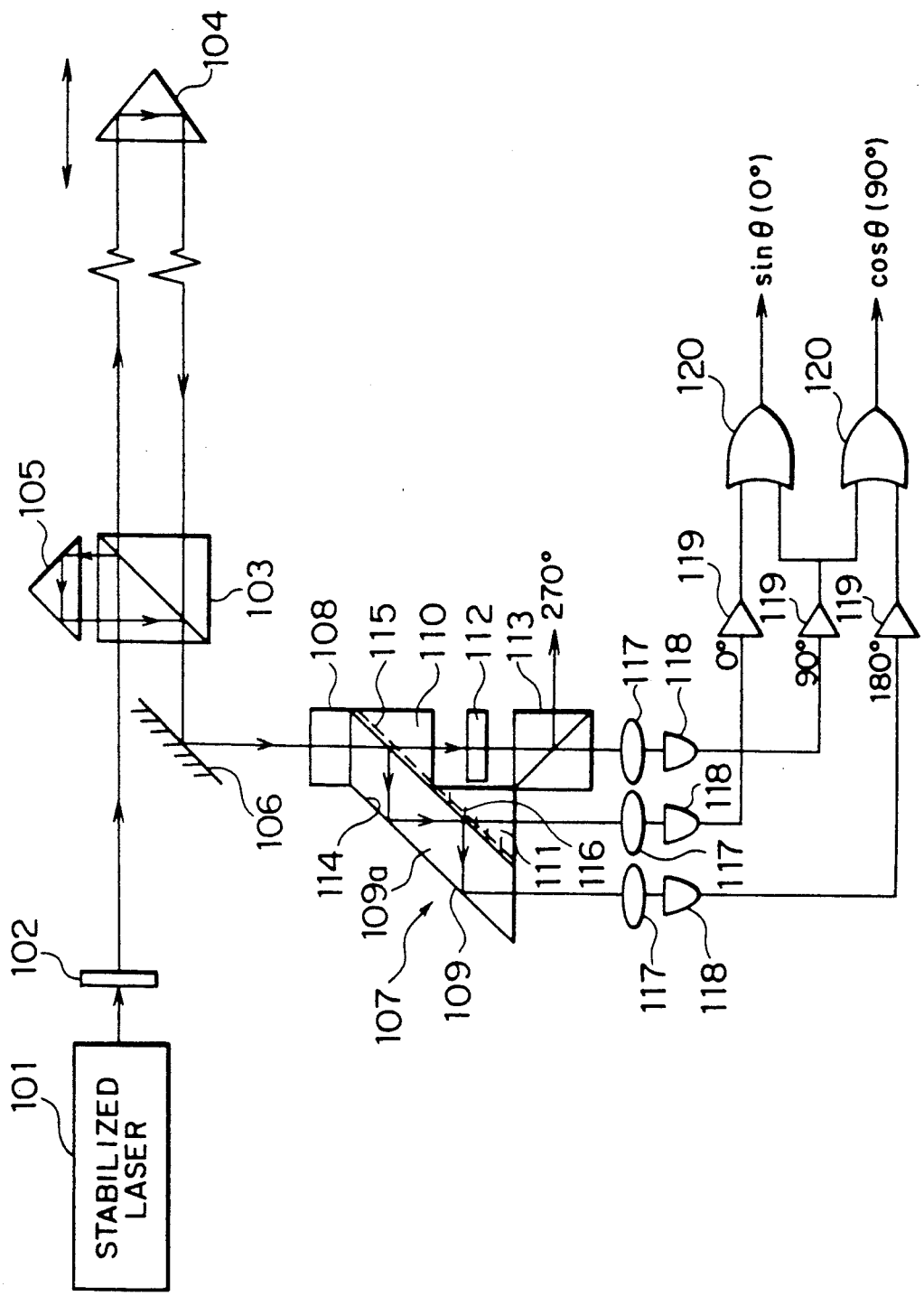
FIG. 8 is a schematic system diagram of a laser interferometry length measuring apparatus employing a polarization detecting optical system related to the second example of the invention, FIGS. 9-12b respectively represent plan views showing the second example of a polarization detecting optical system related to the invention.

FIG. 8 showing the example represents a laser interferometry length measuring apparatus employing a polarization detecting optical system related to the invention, wherein a beam from stabilized laser light source 101 is changed to a circularly polarized beam after passing through λ/4 phase plate 102, and then is split by polarization beam splitter 103 into a reference beam and a length measuring beam each being a linearly polarized beam and each meeting at right angles each other. A length measuring beam as a transmission beam in the polarization beam splitter 103 is reflected on movable corner cube (a movable mirror) 104 and is returned to the polarization beam splitter 103. The reference beam that is a reflected beam on the polarization beam splitter 103 is reflected on fixed corner cube 105 and then is combined, in the polarization beam splitter 103, with the length measuring beam returned from the aforesaid movable corner cube 104.

The length measuring beam, the reference beam and a combined beam (hereinafter, referred to as a detection beam) reflect on mirror surface 106 provided to be inclined by 45° against an optical axis from the polarization beam splitter 103, and thereby deflect by 90° to advance and enter polarization detecting Optical system 107.

Figure 9:
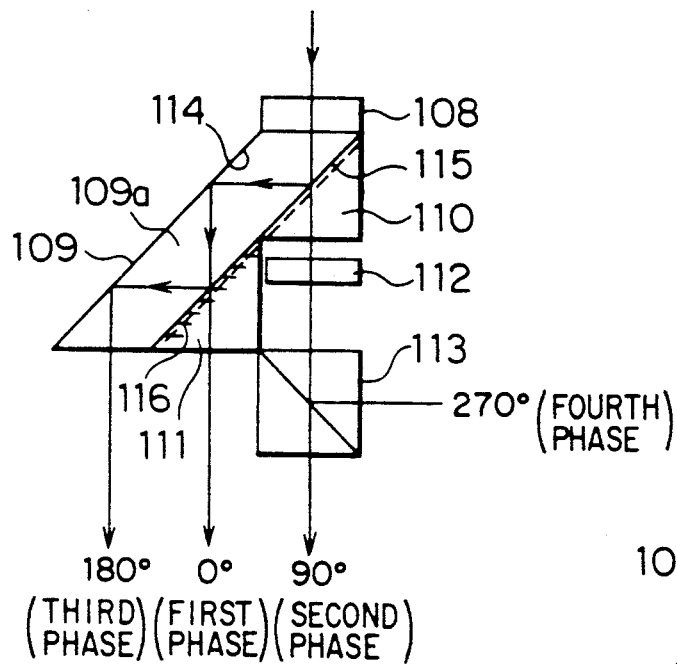

The aforesaid polarization detecting optical system 107 is provided solidly with an optical element composed of 45° rotatory polarization plate 108, parallel-plate-shaped prism 109, triangle prisms 110 and 111, λ/4 phase plate 112 and polarization beam splitter 113, as shown with enlargement in FIG. 9 in the present example and is provided with focusing lens 117 which narrows detected beams having different phases so that they may be received by a detection section.

On one of both end surfaces facing each other in parallel on the aforesaid parallel-plate-shaped prism 109, there is formed reflection surface 114, and on the surface of the other end surface where a beam is split toward and backward, there are provided partially and independently the beam split coat 115 and polarization beam split coat 116 in this sequence.

On the coat surface of each of the aforesaid beam split coat 115 and the polarization beam split coat 116, each bottom surface corresponding to a right-angled vertical angle of triangle prisms 110 and 111 each having a section of a right-angled equilateral triangle is cemented.

Further, on the aforesaid parallel-plate-shaped prism 109, there is formed cut surface 109a so that the section may be a parallelogram and its internal included angle may be 45°, reflection surface 114, beam split coat 115 and polarization beam split coat 116 are provided to be inclined by 45° against an optical axis of a detection beam reflected on the mirror surface 106, and the cut surface 109a is arranged so that it crosses the aforesaid optical axis at right angles, thereby a detection beam entering prism 109 at right angles against the cut surface 109a thereof can enter beam split coat 115 first.

On the cut surface 109a at the incident side for the detection beam, there is cemented 45° rotatory polarization plate 108, and the detection beam which passes through the 45° rotatory polarization plate 108 and enters prism 109 via cut surface 109a is split, by beam split coat 115 having only a function to simply split a beam without polarizing, into two directions including a transmission direction and a reflection direction.

The reflected beam from the beam split coat 115 advances after being deflected by 90° against an incident beam, and reflects on reflection surface 114 provided on the other end surface of prism 109 to return through the prism 109, and enters polarization beam split coat 116 as a beam that is in parallel with an incident beam.

On the polarization beam split coat 116, a detection beam is split into a transmission beam (0°) and reflected beam (180°) both are different by 180° in terms of polarization direction, and the transmission beam goes out of an end surface of triangle prism 111 which meets with an optical axis of the transmission beam at almost right angles, and the reflected beam reflects on the reflection surface 114 again and goes out of the cut surface 109a of prism 109 which meets with an optical axis at right angles, as a beam in parallel with a beam entering beam split coat 115 and polarization beam split coat 116.

On the other hand, a detection beam that passes through beam split coat 115 and advances straight passes through triangle prism 110, goes out of an end surface meeting with an optical axis at right angles, passes through λ/4 phase plate 112 and enters polarization beam splitter 113 after being phase-shifted by 90°. The detection beam phase-shifted by 90° after passing through λ/4·phase plate 112 is split by a polarization beam splitter 113 into transmission beam (90°) and reflected beam (270°) both are different by 180° in terms of polarization direction.

Therefore, the transmission beam (90°) from the aforesaid polarization beam splitter 113, the reflected beam (180°) from the polarization beam split coat 116 provided on prism 109 and the transmission beam are obtained as three-phase signals which are in parallel with an optical axis of an incident beam for the aforesaid polarization detection optical system and different each other by 90°, thus, the reflected beam (270°) alone from the polarization beam splitter 113 is obtained as a beam which meets with the aforesaid incident beam at right angles.

In the present example, each of the aforesaid three-phase signals (0°, 90°, 180°) is narrowed by the focusing lens 117 and is received by a light-receiving section of photoelectric converting element 118 such as a photodiode. An output of each photoelectric converting element 118 is amplified by amplifier 119 and then is subjected to subtracter 120 wherein two-phase signals (sin $\theta$, cos $\theta$) differing by 90° in terms of phase are generated by taking difference between two-phase signals. Thus, even when intensity level of interference fringes is varied by deviation of an optical axis or by flickering air, the direction of the phase change of interference fringes can be specified by eliminating such variation of intensity.

In the polarization detecting optical system 107 having the structure mentioned above, beam split coat 115, polarization beam split coat 116 and reflection surface 114 are provided respectively on both end surfaces facing in parallel on the parallel-plate-shaped prism 109. Therefore, parallelism between reflection surface 114 and the beam split coat 115 and parallelism between the reflection surface 114 and the polarization beam split coat 116 can be obtained accurately. Accordingly, parallelism between an incident beam to the beam split coat 115 or to the polarization beam split coat 116 in prism 109 and a reflected beam on the reflection surface 114 can be obtained accurately. In addition to that, when a detection beam enters a prism from the outside as in the present example, or when the beam goes out of the prism, the surface of the prism to which a beam enters or from which a beam goes out is arranged to meet with an optical axis at right angles. Therefore, the deflection of the beam is prevented when the beam enters or goes out, and parallelism to be obtained finally among three-phase signals (0°, 90°, 180°) which differ each other by 90° in terms of phase can be assured accurately.

As described above, it is possible to prevent fully the deviation of an optical axis of the beam that is polarized and split in the polarization detecting optical system 107. Therefore, photoelectric converting element 118 can be positioned easily and accurately against the beam, and a plurality of interference fringes may appear in the detection beam if the aforesaid relative positions are secured. In addition to that, even when a section of the beam for irradiation is larger than the light-receiving area of the photoelectric converting element 118, it is possible to avoid that the phase relation of three-phase signals detected by the photoelectric converting element 118 gets out of order greatly.

Further, when making the detection beam that is a combination of a reference beam and a length measuring beam both meeting at right angles each other and being in a direction of a linearly polarized beam to enter, it is not necessary to incline the reflective surface of a prism by 45° against an optical axis for the purpose of preventing occurrence of polarization, because the detection beam has passed the 45° rotatory polarization plate 108 already before entering parallel-plate-shaped prism 109.

Figure 10:
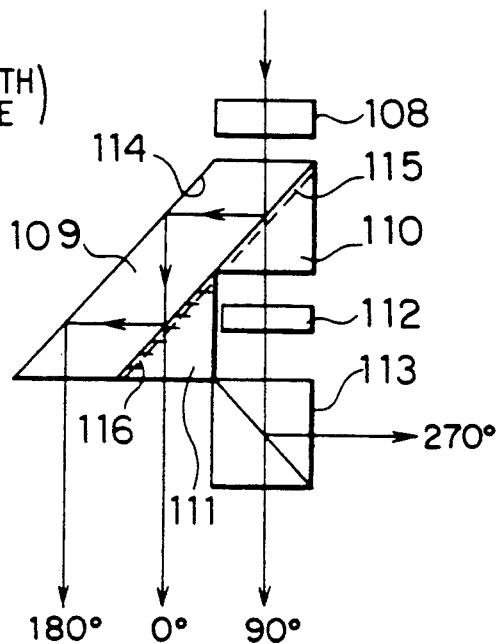

The aforesaid 45° rotatory polarization plate 108 may either be cemented to the parallel-plate-shaped prism 109 as shown in FIG. 9 or be provided separately from the parallel-plate-shaped prism 109 as shown in FIG. 10. However, it is more preferable to cement the 45° rotatory polarization plate 108 to the parallel-plate-shaped prism 109 as shown in FIG. 9 because it is possible to reduce the surface reflection.

Furthermore, though a transmission beam and a reflected beam with regard to polarization beam split coat 116 go out respectively of different end surfaces of a prism in the structure shown in FIG. 9, it is possible to further improve the parallelism between the transmission beam (0°) and the reflected beam (180°) both concerning the polarization beam split coat 116, by changing the aforesaid structure.

Figure 11:
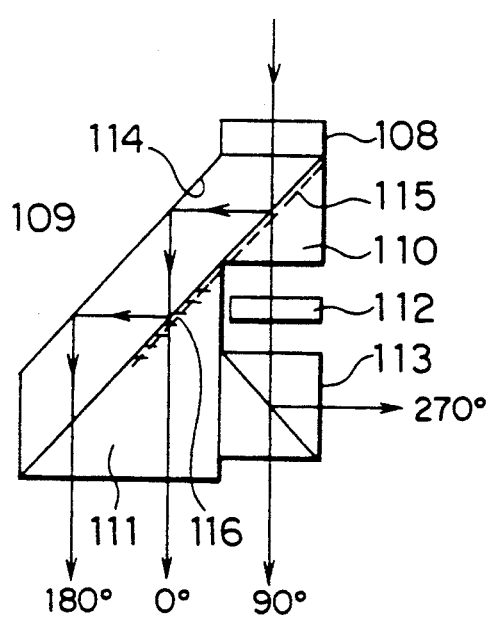

In FIG. 11, a non-coated area is provided on the edge of an end surface of the parallel-plate-shaped prism 109 at the side of polarization beam split coat 116 out of two end surfaces to be provided respectively with beam split coat 115 and polarization beam split coat 116 so that a beam reflected on the polarization beam split coat 116 and further reflected on the reflection surface 114 may pass through the aforesaid non-coated area. In the structure shown in FIG. 9, on the other hand, triangle prism 111 cemented to cover polarization beam split coat 116 is cemented to cover also the aforesaid non-coated area in addition to the polarization beam split coat 116, thus, both a transmission beam and a reflected beam with regard to the polarization beam split coat 116 go out of the same end surface of the aforesaid triangle prism 111.

In the case of the structure shown in FIG. 9, when the parallelism between an outgoing surface of triangle prism 111 and an outgoing surface (cut surface 109a) of the parallel-plate-shaped prism 109 is not secured, the parallelism is affected by refraction in the course of outgoing from prism 109 or 111 even when the transmission beam and the reflected beam both related to the polarization beam split coat 116 are kept to be in parallel each other until their outgoing. However, when both beams are arranged to go out of the same end surface, the parallelism between two beams after their outgoing can be secured even when an optical axis does not cut the outgoing surface at right angles.

In addition to the above, as shown in FIG. 8, a detection beam can be guided to the detection portion efficiently when signals having different phases after being split are narrowed respectively by the focusing lens 117 and are received by photoelectric converting element 118.

Figure 12A:
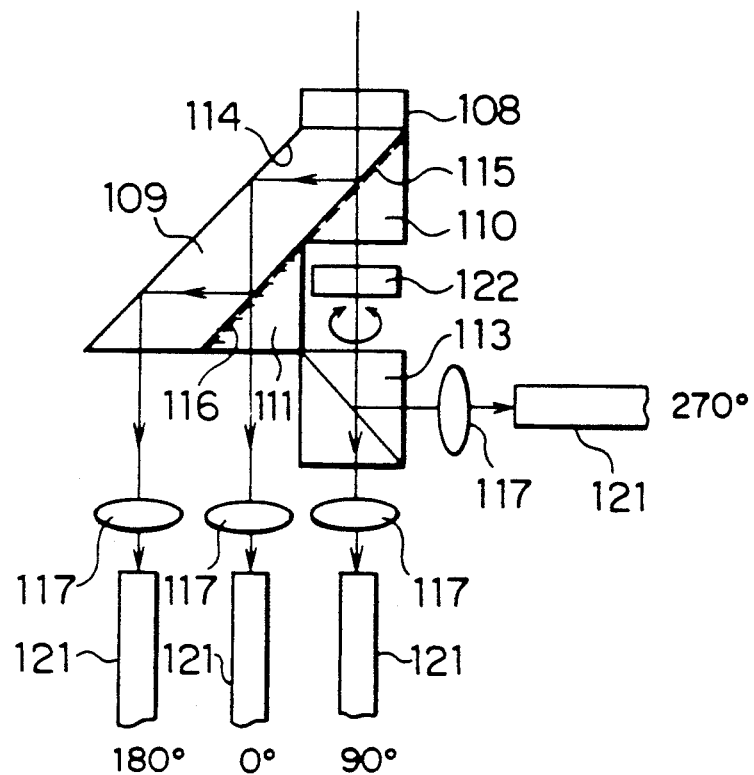

Incidentally, a detection beam narrowed by the aforesaid focusing lens 117 may be received not by photoelectric converting element 118 directly but by the light-receiving surface of light guide 121 as shown in FIG. 12 which guides the detection beam to the photoelectric converting element 118.

In this case, when detection signals are narrowed by the aforesaid focusing lens 117, it is necessary to make the narrowed area to be larger, for light-receiving, than the area of light-receiving section of photoelectric converting element 118 or of light guide 121 because it is difficult to use if the tolerance for tilt is not sufficient.

In case of using four-phase signals (0°, 90°, 180°, 270°) including reflected beam (270°) from polarization beam splitter 113, a reflected beam from the polarization beam splitter 113 also is to be narrowed by focusing lens 117 to be received by the photoelectric converting element 118 or by the light guide 121 as shown in FIG. 12.

In the above-described example, splitting is made into 90° and 180° by polarization beam splitter 113 after shifting the phase by 90° by means of $\lambda/4$ phase plate 112. In this case, when an polarization axis of the incident beam against the axis of $\lambda/4$ phase plate 112 is deviated, phase shifting by 90° at the $\lambda/4$ phase plate 112 can not be made accurately, and thereby the phases for the second phase (90°) and the fourth phase (270°) can not be assured accurately. Therefore, the following structure is desirable.

To be concrete, a phase plate 122 (retardation more than $\lambda/4$) is used in place of the aforesaid $\lambda/4$, a phase advancing axis or a phase retarding axis is set to 45°, for example, against the polarization direction of the detection beam which is a combination of a reference beam and a length measuring beam both meeting at right angles in terms of polarization directions and being linearly polarized beams so that the aforesaid phase plate 122 may rotate around an optical axis with the point where retardation takes place by $\lambda/4$ as the center as shown in FIG. 12, thus, the retardation of the reference beam and the length measuring beam can be varied within a range of phase retardation with the center of $\lambda/4$.

Due to the structure mentioned above, even when the phase angles of the second phase (90°) and the fourth phase (270°) are deviated from 90° and 270° respectively by the condition of setting an optical system, such deviation of phase angle can be corrected by the adjustment of phase angle made by rotation adjustment of the aforesaid phase plate 122.

With regard to the first phase (0°) and the third phase (180°) and with regard to the second phase (90°) and forth phase (270°), the phase difference 180° between them is not varied by the polarization beam split coat 116, but with regard to the first phase (0°) and the second phase (90°), the phase is varied by the deviation of the axis of the incident beam against the phase plate. When the phase plate 122 is supported rotatably, however, the phase deviation caused by the aforesaid optical axis deviation can be corrected, and the first phase and the second phase can be harmonized accurately in terms of a phase angle. With regard to the phase plate 122, it is not limited to $\lambda/2$ phase plate while it has a phase control capability of not less than $\lambda/4$ phase angle.

Figure 12B:
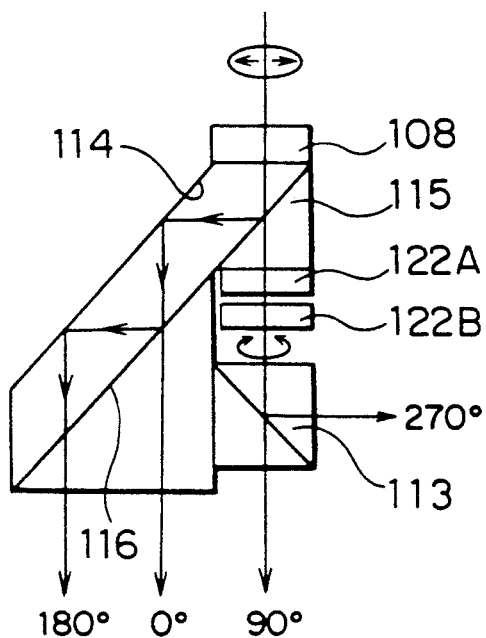
Figure 13:
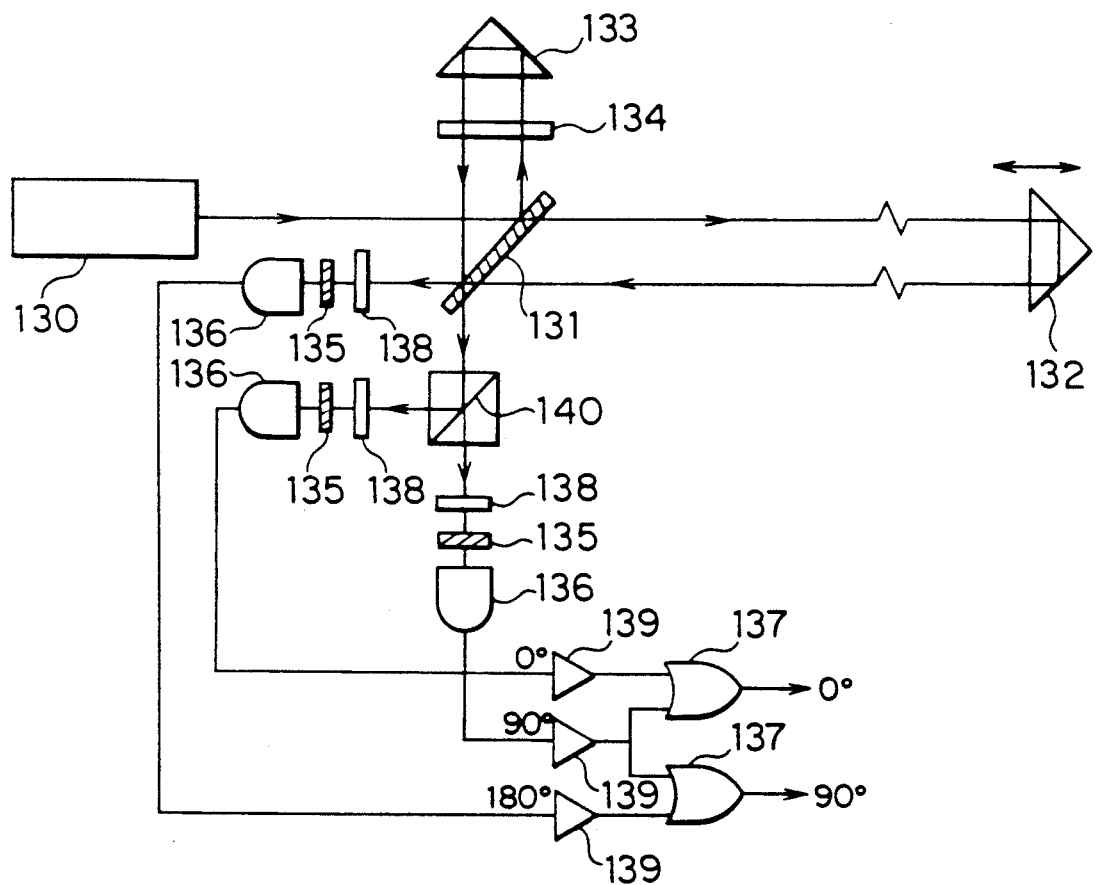
FIG. 13 is a schematic system diagram showing a laser interferometry length measuring apparatus employing a conventional polarization detecting optical system.
Figure 14:
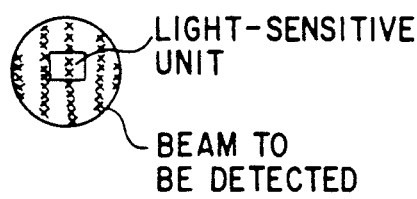
FIG. 14 is a diagram showing the relation between the light-receiving section and a detection beam on the occasion wherein plural interference fringes appear in a detection beam.
Figure 15:
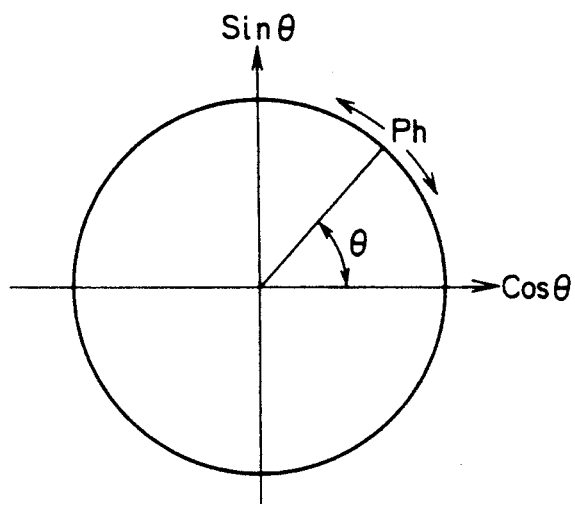
FIGS. 15-17 represent respectively diagrams for illustrating problems of conventional polarization detecting optical systems.
Figure 16:
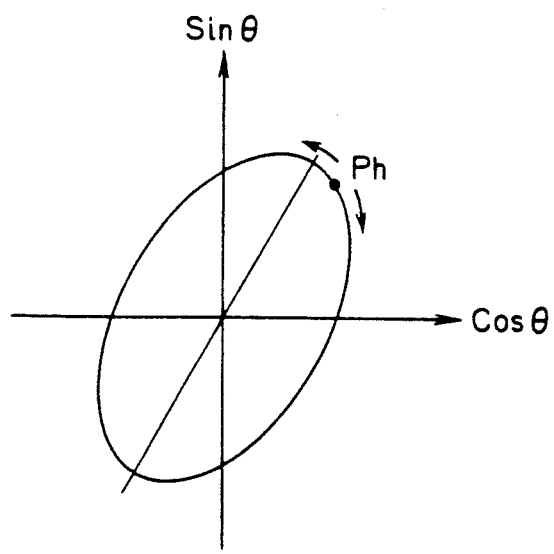
Figure 17:
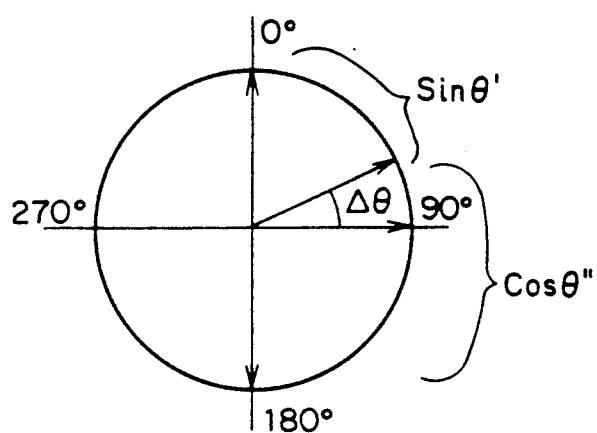

Further, as a method to enhance accuracy for adjusting a phase angle in the example shown in FIG. 12 (A), the example in FIG. 12 (B) can also be considered. Only difference between the optical system in FIG. 12 (B) and that in FIG. 12 (A) is that fixed phase plate 122A having $\lambda/4$ retardation and phase plate 122B for adjustment which has $\lambda/20$ retardation and is rotatable around an optical axis for adjustment and can be fixed are used in place of $\lambda/2$ phase plate 122 in FIG. 12 (A); and a triangle prism which has the same function of triangle prism 111 of FIG. 11 is used. In the optical system in FIG. 12 (B), one turn of phase plate 122 (B) for adjustment, namely, rotation thereof by 360° causes the phases of the second phase (90°) and the fourth phase (270°) of an interference beam to change from a phase given by phase plate 122A within a range from +18° to −18°. Therefore, as long as phase plate 122A keeps the phase of the second phase (90°) of the interference beam against the first phase (0°) thereof to be within a range from 72° to 108°, it is possible to make the phase of the second phase (90°) against the first phase (0°) to be 90° by rotating the phase plate 122B for adjustment around an optical axis. In that case, even when the phase plate 122B for adjustment is set with a deviation of 1° from the correct position, an error of the phase angle from 90° caused by the aforesaid deviation is only 1/10°. Therefore, it is possible to obtain easily and accurately the second phase (90°) and the fourth phase (270°) of an interference beam each having the phase difference of 90° and that of 270° from the first phase (0°) of the interference beam. Further, in this example of FIG. 12(B), it is possible that both of phase plates 122A and 122B are set rotatable around the optical axis so that phase plate 122A is used for coarse adjustment and phase plate 122B is used for fine adjustment.

Therefore, in the polarization detecting optical system 7 used in a laser interferometry length measuring apparatus as in the present example, the phase difference of the second phase at 90° position can be obtained accurately, and consequently, when taking the difference between two phases in three-phase signals (0°, 90°, 180°), it is possible to prevent occurrence of a phase difference between differential signals and to solve the primary error related to the linearity in a laser interferometry length measuring apparatus, thus, length measuring accuracy is improved.

Incidentally, although a laser interferometry length measuring apparatus of an interference fringes counting method is described in the present example, 2-frequency heterodyne system can also be used, and it is possible to obtain two-phase beat signals whose phases are deviated by $\pi/2$ by means of polarization detecting optical system 7 which is exactly the same as that in the above example.

In the laser interferometry length measuring apparatus in the present example, though a reference beam and a length measuring beam are linearly polarized beams meeting each other at right angles in terms of a polarization direction, either one of the reference beam and the length measuring beam can be a circularly polarized beam.

As described above, on the polarization detecting optical system related to the first example of the invention, it is possible to obtain three-phase signals differing in their phases as accurately parallel beams, resulting in easy positioning at a detection portion and it is possible to eliminate the necessity for providing a prism inclining it by 45° by causing the beam to pass through the 45° rotatory polarization plate before its entering. Further, since phase plates having the phase difference of a quarter of a wavelength or more are supported around the optical axis rotatably, it is possible to correct, by means of the rotations of the aforesaid phase plates, the phase deviation caused by the deviation of the optical axis. It is further possible to guide the beam efficiently to the detection section by narrowing the obtained signals differing in terms of a phase by the focusing lens and making them to be received by the light-receiving section. Therefore, the polarization detecting optical system mentioned above employed in a laser interferometry length measuring apparatus has attained improvements in accuracy of length measurement.

What is claimed is:

1. A laser interferometry length measuring apparatus for determining a moving distance of an object, comprising:
    means for dividing a source light beam to a measuring beam and a reference beam;
    means, placed to said object, for reflecting said measuring beam;
    means for composing said reference beam and said reflected measuring beam into a first composed beam;
    means for distributing said first composed beam into a plurality of light beams, including:
        (a) means, having a first surface, for dividing said first composed beam to a first beam, a second composed beam including a second beam and a third beam, wherein said first beam is passed through said first surface, and said second composed beam is reflected by said first surface;
        (b) means, having said first surface, for dividing said second composed beam to said second beam and said third beam wherein said second beam is passed through said first surface, and said third beam is reflected by said first surface; and
        (c) means, having a second surface paralleled to said first surface, for reflecting said second composed beam and said third beam by said second surface so that said first beam, said second beam, and said third beam are directed parallel, and said second beam is emitted from said first surface; and
    means for determining said moving distance of said object according to said first beam, said second beam, and said third beam.

2. The apparatus of claim 1, wherein said dividing means of said first composed beam includes means for compensating phase of said first beam so that said first beam has a phase $\lambda/4$ different from that of said second beam, and said dividing means of said second composed beam includes means for compensating phases of said third beam so that said third beam has a phase $\lambda/2$ different from that of said second beam.

3. The apparatus of claim 2, wherein said composing means includes a 45° rotatory polarization plate.

4. The apparatus of claim 3, wherein said distributing means includes a prism having said first surface and said second surface.

5. The apparatus of claim 4, wherein said 45° rotatory polarization plate is attached to said prism.

6. The apparatus of claim 4, wherein said compensating means has a compensation member to adjust the phase of at least one of said first beam and said third beam.

7. The apparatus of claim 6, wherein said compensation member is a phase plate being rotatable to adjust the phase of said first beam.

8. The apparatus of claim 6, wherein said compensation member is a plurality of phase plates, and at least one of said phase plates is rotatable to adjust the phase of said first beam.

9. The apparatus of claim 4, wherein said determining means includes a focusing lens for condensing said first beam, said second beam, and said third beam.

10. The apparatus of claim 4, wherein said third beam is emitted from said first surface.

* * * * *